United States Patent Office 3,429,245
Patented Feb. 25, 1969

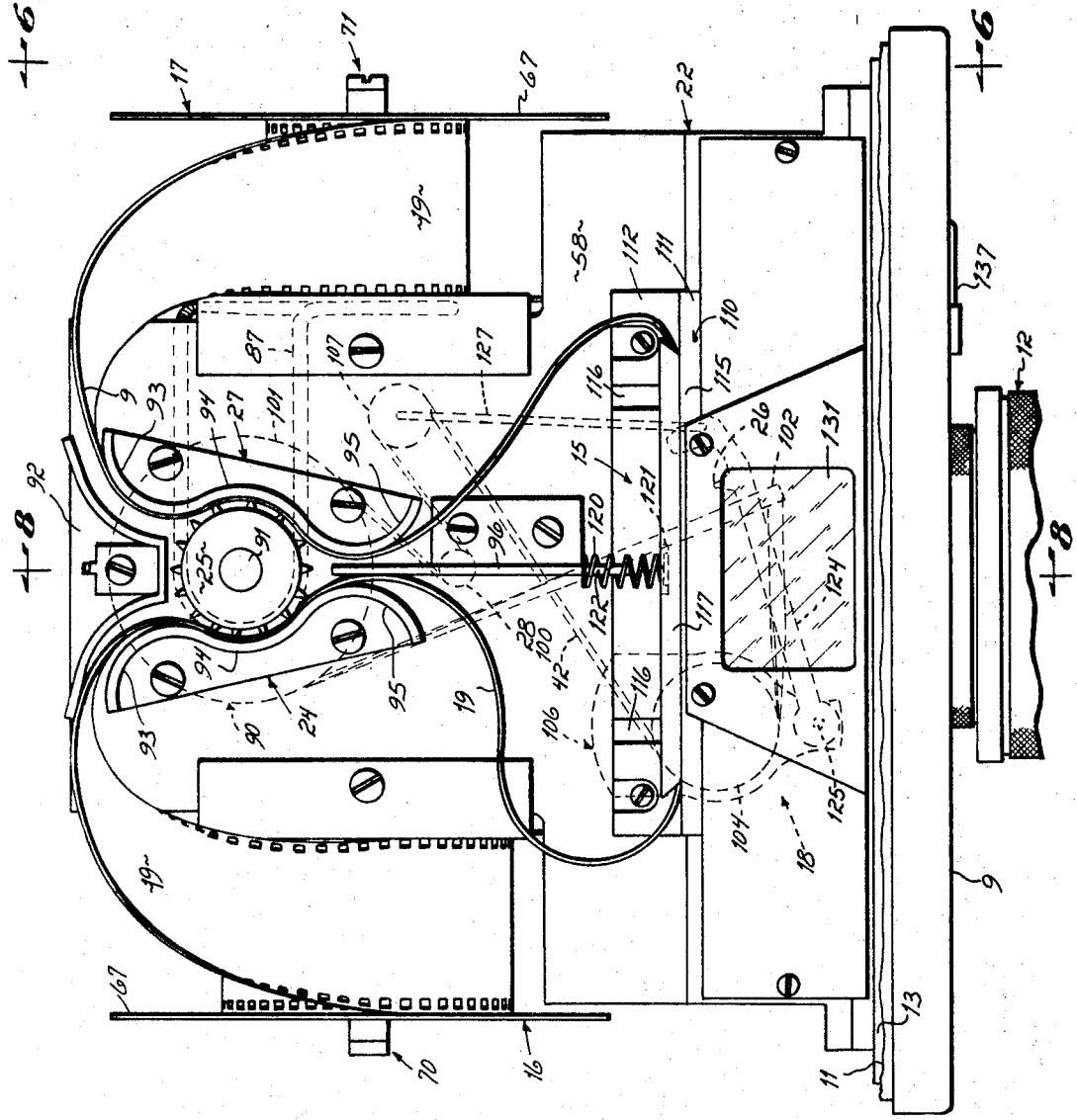

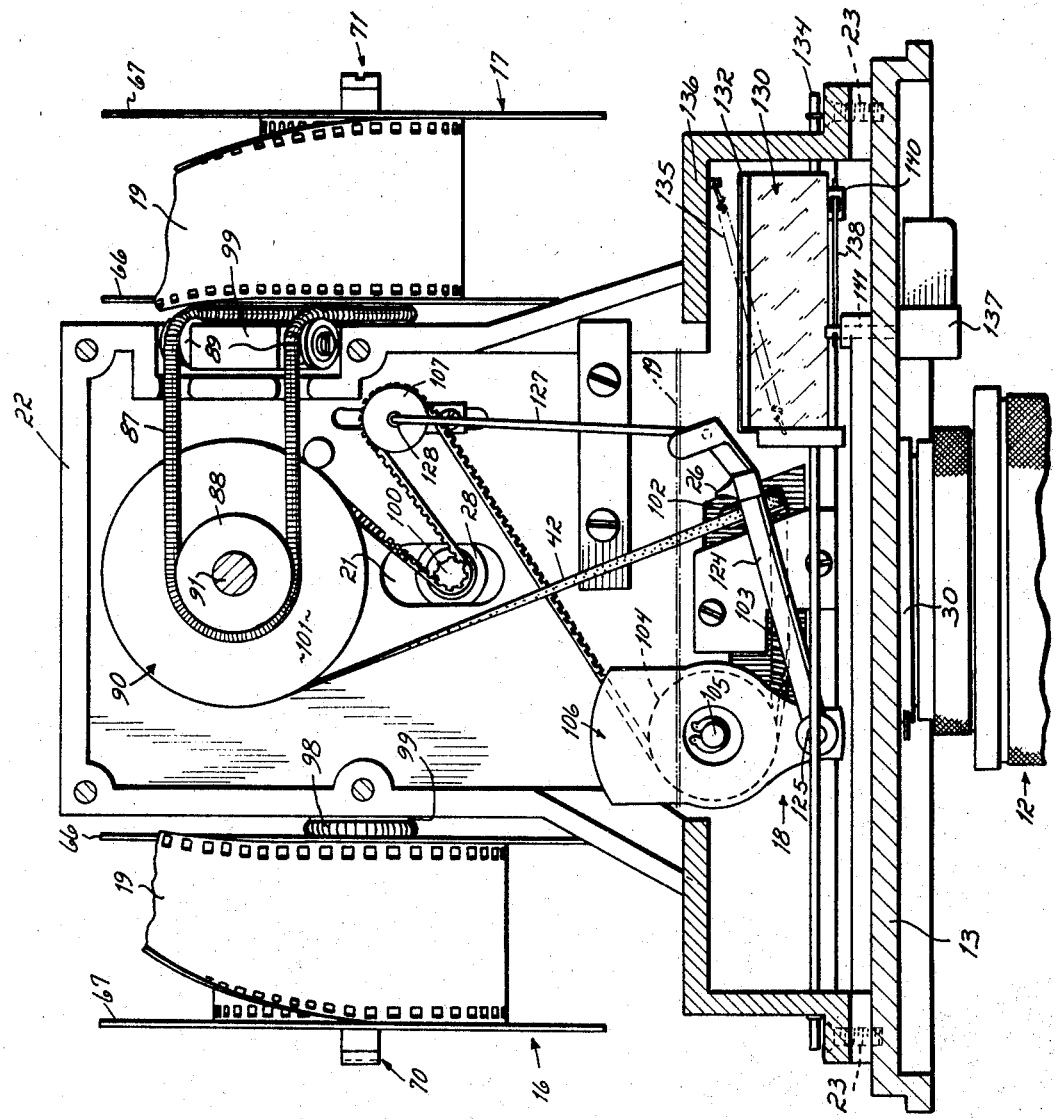

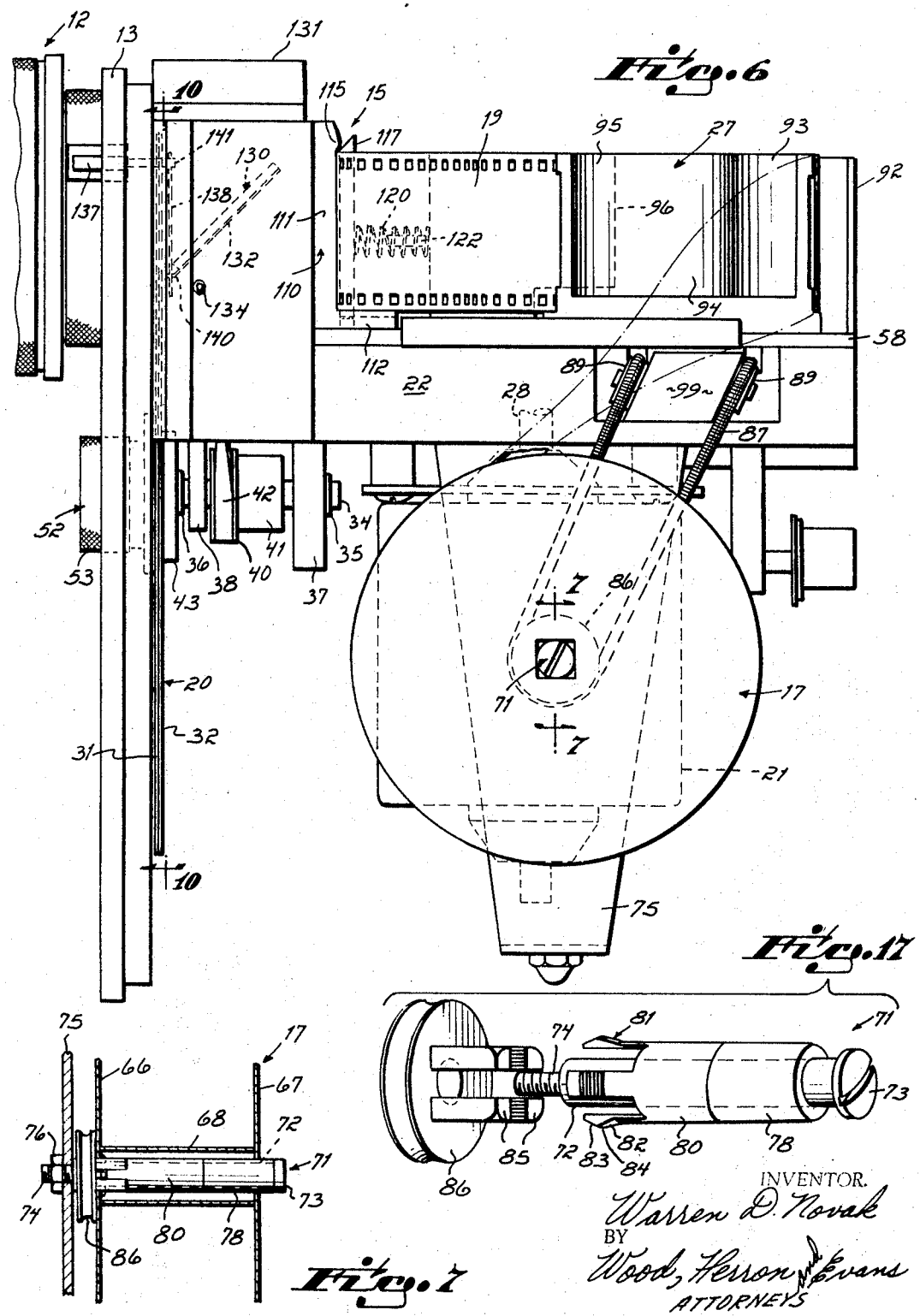

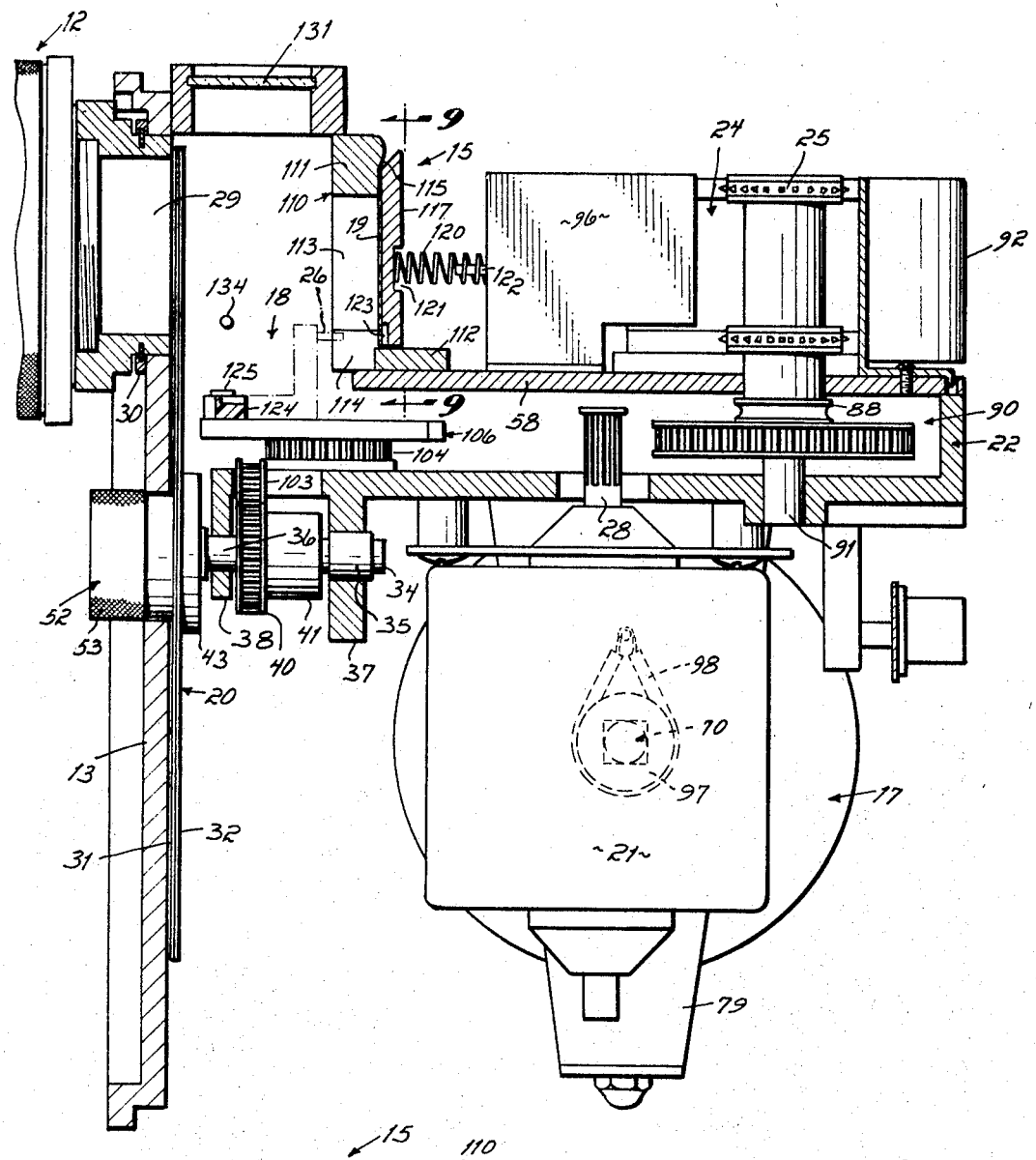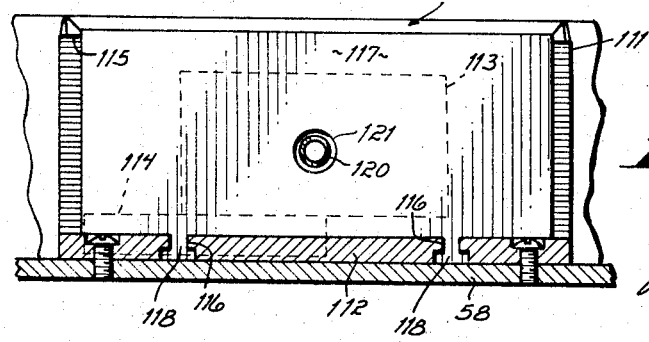

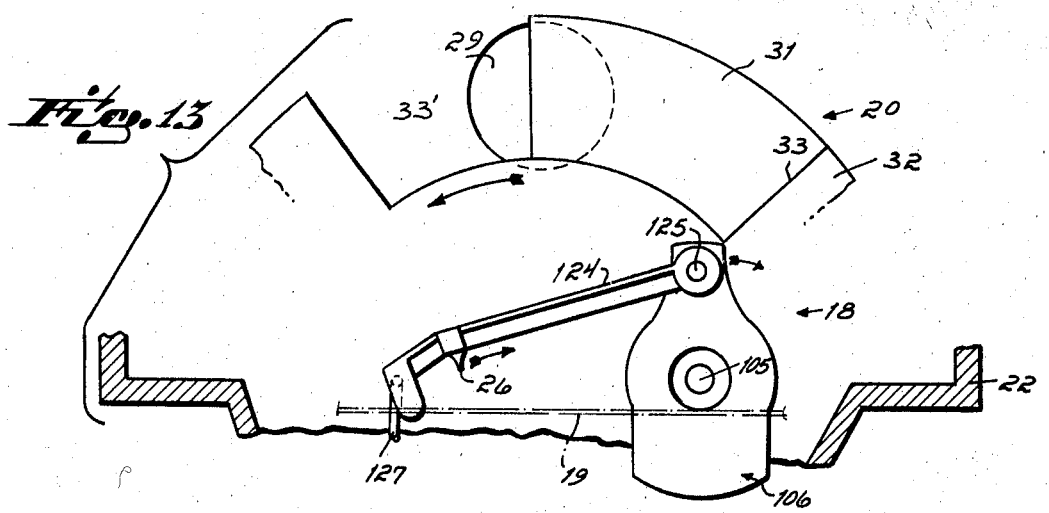
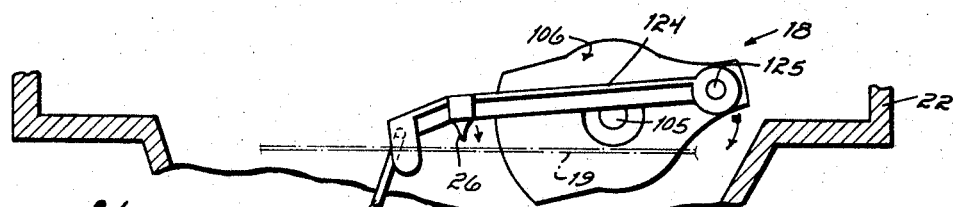
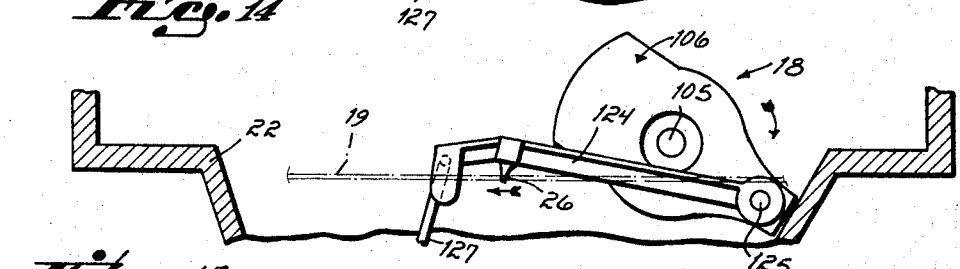
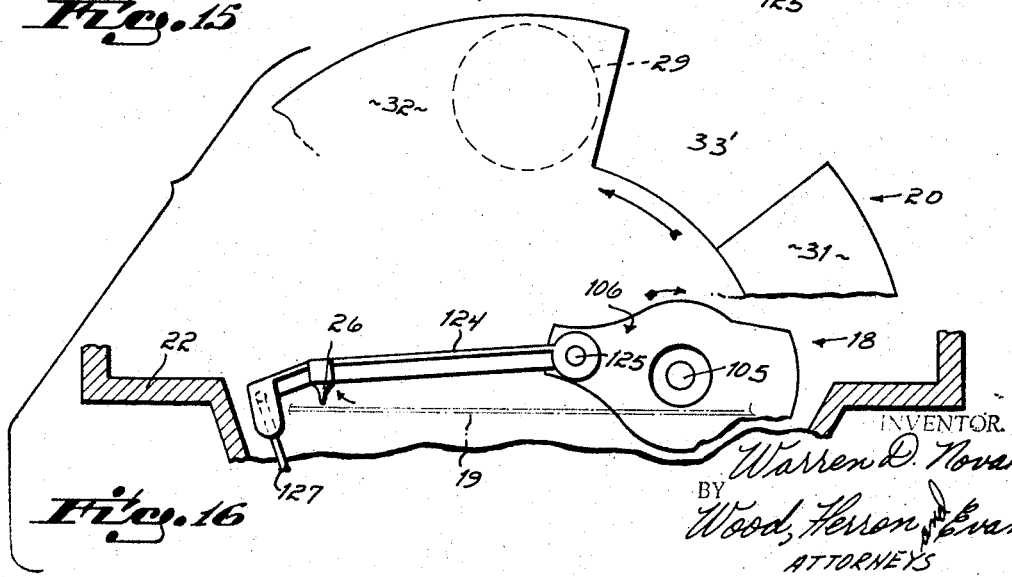

3,429,245
SEQUENCE CAMERA
Warren D. Novak, Chappaqua, N.Y., assignor to Mosler Research Products, Inc., Danbury, Conn., a corporation of Delaware
Filed Sept. 30, 1966, Ser. No. 583,295
U.S. Cl. 95—11     14 Claims
Int. Cl. G03b 19/00, 9/10, 1/04

ABSTRACT OF THE DISCLOSURE

A high speed sequence camera particularly useful for surveillance work. The camera has a large film capacity, e.g. 300 feet, and yet is extremely compact and quiet. The camera comprises a motor having a takeup reel and a supply reel disposed on opposite sides of the motor and of a two-piece rotary shutter. The reels are mounted on novel mounts which prevent rattling. A single sprocket wheel engages the film before it enters the film gate and after it emerges the film gate. A claw engages a perforation of the film beneath the main aperture of the film gate and is effective to pull the film through the film gate. The takeup reel, sprocket, film advance claw and rotary shutter are driven from the motor through flexible drive belts.

---

The present invention relates to photographic apparatus and is particularly directed to a remotely controlled, motor driven high speed sequence camera useful in surveillance work and the like.

In recent years it has been found highly advantageous to provide cameras for taking sequential photographs of selected areas, such as the area in front of a teller's cage in a bank. These cameras are actuated by the teller, or other person, during a robbery and are effective to obtain photographs of the robber. These photographs are subsequently published in newspapers and circulated among law enforcement agencies to aid in the apprehension of the criminal.

The principal object of the present invention is to provide an improved sequence camera of this type which is effective to provide relatively large format pictures which retain an appreciable amount of detail even when the pictures are greatly enlarged for publication in a newspaper.

The present camera is electric motor driven and is adapted to be mounted upon a wall, or the like, located some distance from the teller's cage. One of the desiderata of a sequence camera adapted for surveillance work is that it be effective to take a large number of pictures without reloading. A holdup may last several minutes. Out of this total period, the robber's face may be exposed to the camera for only a few seconds. Accordingly, in order to maximize the chances of obtaining a good photograph, it is desirable that the camera take several hundred photographs in rapid order over a several minute period.

The present sequence camera utilizes a 35 millimeter roll film and can be operated at selected speeds up to eight frames per second. The camera is adapted to store from one hundred up to three hundred feet of film. Consequently, an exceedingly large number of relatively large format pictures are obtained from a single roll of film.

A second desiderata of a sequence camera is that it be compact and quiet in operation. The present camera is exceedingly compact for its film capacity. This compactness is achieved in part by orienting the supply and takeup reels in two parallel vertical planes on opposite sides of the camera. All of the camera components are driven from a single electric motor mounted between the reels. The camera utilizes a rotary shutter and includes a film advance mechanism effective to advance the film stepwise through a film gate behind the shutter. The film passes horizontally through the film gate in a plane above the reels. A single sprocket engages the film both as the film passes from the supply reel to the film gate and as the film passes from the film gate to the takeup reel.

The maximum compactness of the present camera is also achieved through the use of a novel film advance mechanism. This film advance mechanism includes a claw which engages a perforation of the film beneath the main aperture of the film gate and is effective to pull the film through the film gate. The claw is carried by a claw arm pivotally secured to a drive crank and to a pivot link. The disposition of the claw relative to the film gate and the relative sizes of these three members permit a relatively small film advance mechanism to effect a large film advance.

In accordance with the present invention, the rotary shutter, sprocket, film advance mechanism and takeup reel are belt driven, preferably by means of a light, thin timing belt. As a consequence, despite the fact that the various elements are driven in different planes and directions, they can be mounted close together providing maximum overall compactness. The thin flexible drive belt also provides exceedingly quiet operation.

Another object of the present invention is to enhance the quiet operation of the camera by virtue of a novel reel mount which firmly grips one wall of the reel and clamps it against a face of an adjacent drive pulley. As a result, the reel does not wobble or rattle as in many cameras and no noise is created which would alert a robber to the fact that his picture was being taken.

Another object of the present invention is to provide a novel rotary shutter construction having a variable width aperture which can be selectively adjusted to provide an adjustment of shutter speed. In accordance with the present invention, the shutter comprises two shutter discs, or blades, mounted for rotation about a single shaft. Each of the discs is provided with a cutout segment. The discs can be oriented so that these segments are in complete registry, providing maximum effective aperture, or alternatively, the discs can be shifted relative to one another so that each disc partially overlaps the aperture of the other to decrease the effective aperture.

In the present camera the shutter blades are readily adjusted by a mechanism including a knob which carries a pin passing through an opening in the front shutter blade. This pin is placed in selective engagement with one of a series of openings in the rear shutter blade to rigidly interconnect the two blades. This pin can be shifted axially so that it remains in engagement with the opening in the front blade, but is disengaged from the openings in the rear blade by pulling the knob outwardly. The knob is then turned, rotating the front blade relative to the rear blade. When the desired aperture size or speed setting is obtained, the knob is again pushed inwardly to reengage the pin with an opening in the rear blade. The knob is then secured in position, firmly locking the shutter blades together for rotation on the drive shaft. This same knob can then be turned to manually rotate the shutter to a selected position.

Another object of the present invention is to provide an improved camera which is simple and reliable in operation and which can easily be loaded even though the camera is in a somewhat inaccessible position. More particularly, in the present camera the lens, film reels, shutter and other operating parts of the camera are mounted on a single sub-assembly which can be pulled as a unit from the camera housing. The film path from the supply reels to the film gate and from the film gate to the takeup reel is completely exposed on the upper wall of this sub-assembly. The camera further includes a novel film gate which is easily manipulated to allow insertion of the film and can be readily disassembled to permit cleaning and the like.

These and other objects and advantages of the present invention will be more readily apparent from a consideration of the following detailed description of the drawings illustrating a preferred embodiment of the invention.

In the drawings:

FIGURE 4 is a cross sectional view taken along line 4—4 of FIGURE 1.

FIGURE 5 is a cross sectional view taken along line 5—5 of FIGURE 1.

FIGURE 6 is a cross sectional view taken along line 6—6 of FIGURE 4.

FIGURE 7 is an enlarged cross sectional view of the reel mount taken along line 7—7 of FIGURE 6.

FIGURE 8 is a cross sectional view taken along line 8—8 of FIGURE 4.

FIGURE 9 is a cross sectional view taken along line 9—9 of FIGURE 8.

FIGURE 13 is a semi-diagrammatic view showing the relationship between the rotating aperture disc and film advance claw at the end of an exposure.

FIGURE 14 is a view similar to FIGURE 13 showing the film claw being advanced toward engagement with the film.

FIGURE 15 is a view similar to FIGURE 13 showing the film claw in engagement with and shifting film into engagement for a subsequent exposure.

FIGURE 16 is a view similar to FIGURE 13 showing the film and claw at the beginning of an exposure.

FIGURE 17 is an exploded perspective view of a reel supporting shaft.

Figure 1:
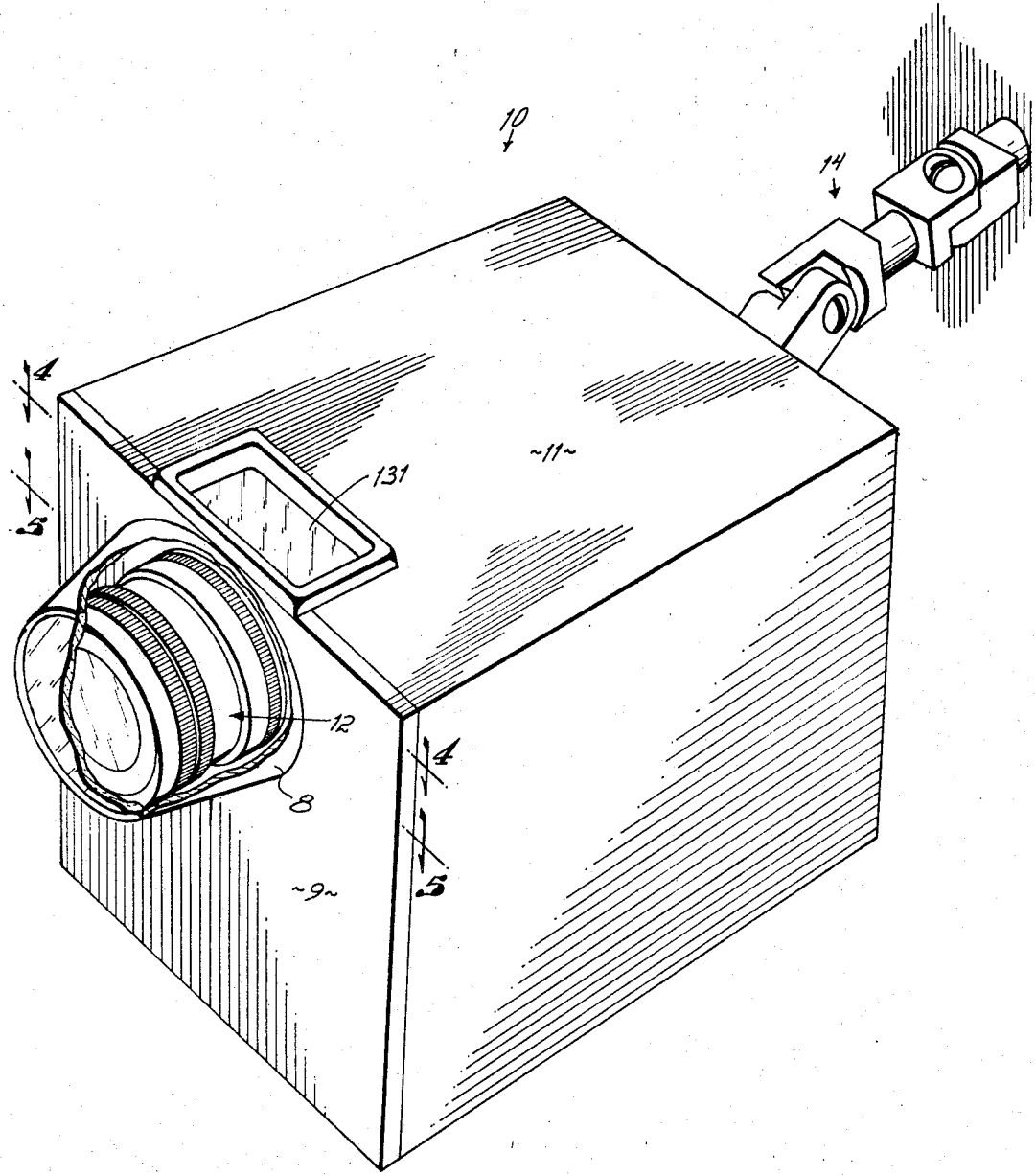
FIGURE 1 is a perspective view, partially broken away, of one preferred form of camera constructed in accordance with the present invention.
Figure 2:
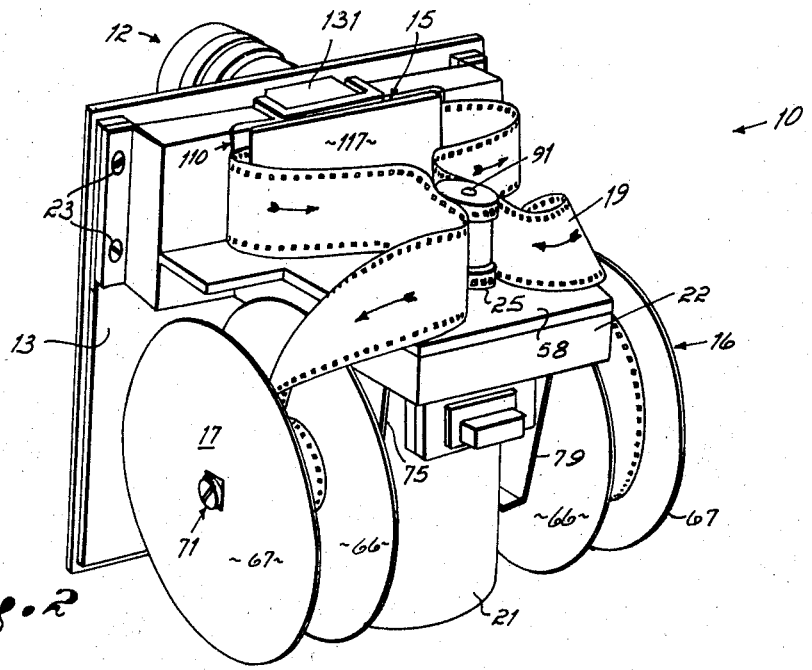
FIGURE 2 is a perspective view of the camera interior with the cover and film guides removed showing the path of film travel.
Figure 3:
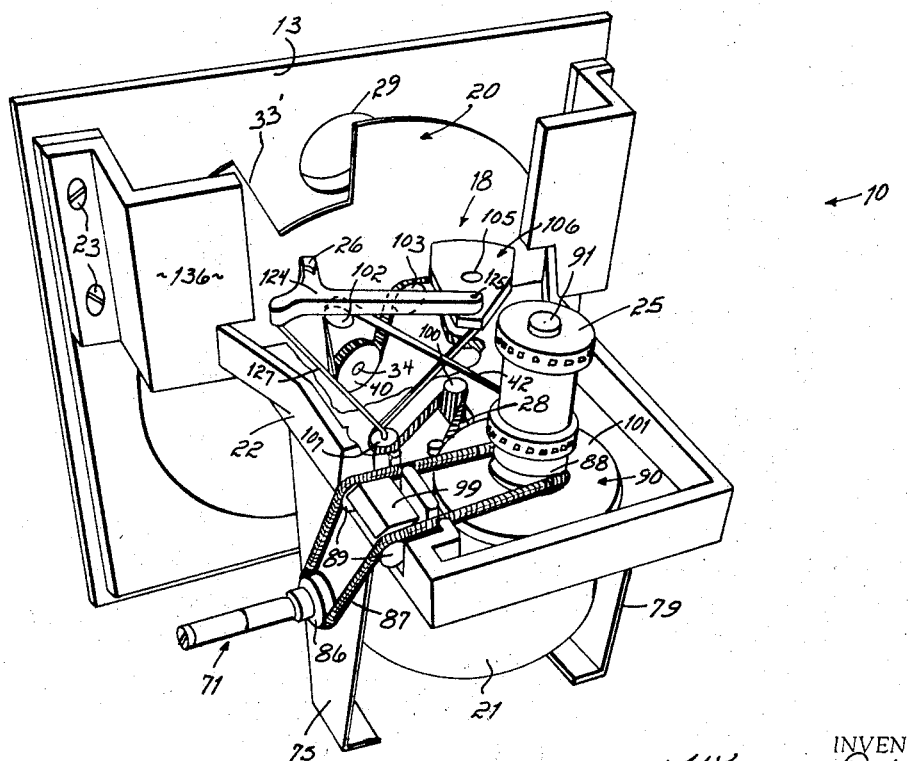
FIGURE 3 is a perspective view of the camera with the film, reels and a portion of the inner frame removed to show details of the drive.

The overall construction of one preferred form of sequence camera 10 constructed in accordance with the principles of the present invention is best shown in FIGURES 1, 2 and 3. As there shown, the camera includes a housing 11, and a lens 12 extending outwardly through a front cover panel 9 of the housing. The lens is enclosed in a protective cone 8 forming part of the cover panel, the cone having a clear glass end wall to permit light transmission through the lens. Front cover panel 9 is locked in place by any suitable means (not shown) but when unlocked is readily removable from the remainder of the housing to permit access to the camera mechanism. The camera is adapted to be mounted upon a wall in any suitable manner, such as by means of an adjustable mullion 14, so that the lens 12 is directed toward an area in front of a teller's cage in a bank, an area adjacent a cash register in a store, or the like.

The principal components of the camera, such as the film gate 15, supply reel 16, takeup reel 17, film advance mechanism 18, rotary shutter 20 and drive motor 21, are mounted upon an inner main frame member 22. This frame member is in turn bolted or otherwise secured to an inner panel 13 as by means of bolts 23 and together with the inner panel forms a sub-assembly removable from the rest of the housing when cover panel 9 is removed. As is best shown in FIGURE 2, the supply and takeup reels 16 and 17 are mounted in parallel, vertical planes perpendicular to the focal plane of the camera. The axes of the two reels are aligned and are disposed rearwardly of and below the film gate assembly 15. The film 19 is preferably 35 millimeter roll film. This film, as best shown in FIGURES 2, 3 and 4, passes upwardly from the supply reel 16 between a first stationary guide 24 and a sprocket wheel 25 and enters the film gate assembly 15. The film gate includes a rectangular opening which is disposed behind lens 12 with the rotary shutter 20 being interposed between the lens and film gate.

The film is advanced in step-by-step movement past the film gate by means of a film advance mechanism indicated generally at 18 and including a film advance claw 26. Exposed film is drawn from the film gate and passes between sprocket wheel 25 and a second stationary guide 27. From this guide the film is wound upon driven takeup reel 17. The entire mechanism, including the takeup reel, sprocket 25, shutter 20 and film advance mechanism 18, is belt driven from the output shaft 28 of drive motor 21. The motor 21 is controlled in any suitable manner to provide the desired type of operation of the camera. For example, the camera can be operated as a single frame camera or can be operated to take a sequence of exposures for a selected interval, such as by way of example, four or eight frames per second for ten seconds, or can be operated to provide a continuous sequence of exposures, e.g., four or eight frames per second until the film supply is exhausted. The size of the film supply reel is such that the camera holds from 100 to 300 feet of 35 millimeter film, depending upon the type of film utilized. Consequently, the camera is effective to provide several minutes of continuous operation on a single load of film.

One form of camera control circuit particularly adapted to control motor 21 is disclosed in the copending patent application of Donald E. Hansen and Eric G. Quist for "Camera Control Circuit," Ser. No. 583,320, filed Sept. 30, 1966. More particularly, lens 12 can be any suitable form of lens; for example, a manually adjustable lens having a preset diaphragm. The lens is carried by any suitable form of stationary mounting ring 30 (FIGURE 8) bolted or otherwise secured to inner panel 13. It is to be understood that the lens mounting may either be of the bayonet type or screw-in type. Since these lens mounts are conventional and constitute no part of the present invention, the details are not shown.

Inner panel 13 is provided with an opening 29 positioned behind the lens 12. Rotatable shutter 20 is mounted for rotation in a plane parallel to the front panel 13, the shutter being positioned immediately rearwardly of the front face. Details of the shutter 20 are best shown in FIGURES 6, 8 and 10–12.

More particularly, shutter 20 comprises two discs, or blades; a front disc 31 and a rear disc 32. Each of these discs is provided with a substantially identical peripheral cutout, or removed segment 33. As explained below, discs 31 and 32 are oriented so that their apertures 33 are at least in partial registry with one another. The discs are mounted for rotation with shaft 34 so that the apertures 33 can be brought into alignment with opening 29 to permit light to pass from the lens 12 onto a portion of the film 19 disposed behind the aperture in the film gate assembly. Shaft 34 is rotatably supported in suitable bearings 35 and 36 carried by depending flanges 37 and 38 formed integral with main frame member 22. The shaft carries a grooved pulley 40 formed integral with hub 41. This grooved pulley is adapted to be engaged and driven by main timing belt 42.

It will be appreciated that when shaft 34 is rotated, the shutter 20 is rotated so that the apertures 33 are swept past the lens, permitting light to strike the film. Since motor 21 is a constant speed, high torque motor, the length of the exposure is determined by the arcuate length of the shutter aperture.

The length of exposure is varied by varying the effective length of this aperture. More particularly, front and rear discs 31 and 32 are overlapped. Although in normal operation the discs are rotated in unison, the relative position of these discs can be changed prior to operation of the camera to select the desired shutter speed. Considering FIGURE 10, it will be appreciated that when the two shutter blades are oriented so that their arcuate segments are in complete alignment, the resulting effective aperture 33' will be maximum. However, when the shutter discs are rotated relative to one another, for example to the position shown in FIGURE 10, the uncut portion of each blade overlaps to some extent the aperture of the other blade so that the effective shutter aperture 33' is substantially shorter than the maximum aperture. This corresponds to a substantially faster exposure.

Figure 10:
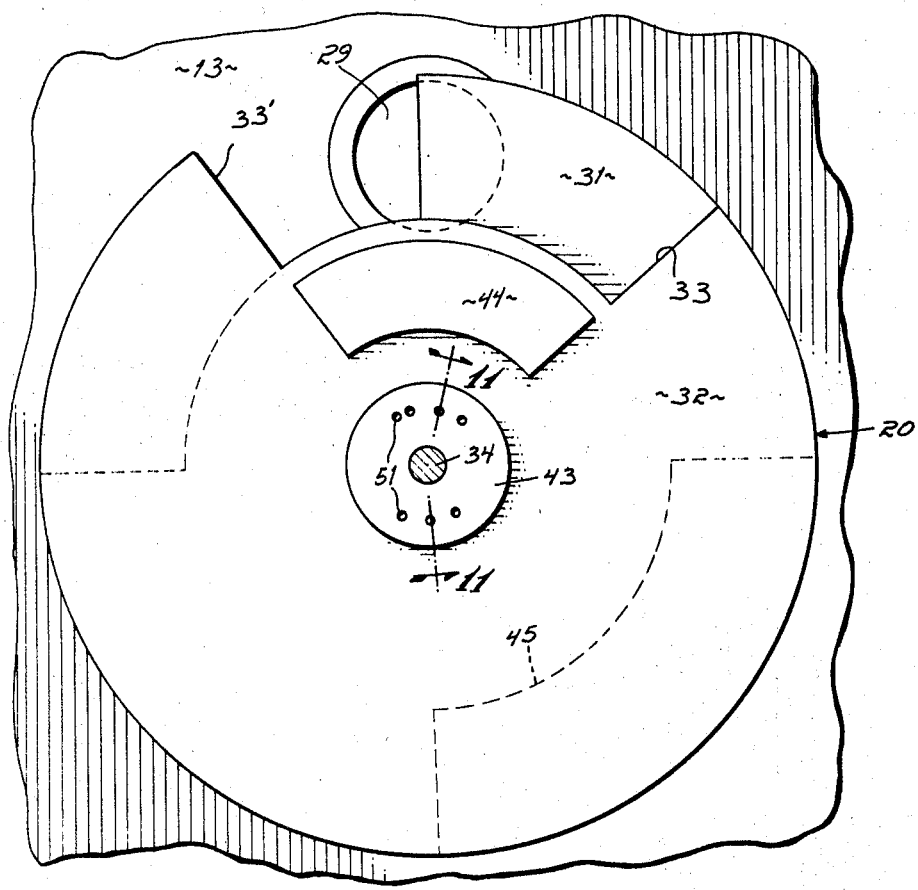
FIGURE 10 is a cross sectional view taken along line 10—10 of FIGURE 6.
Figure 11:
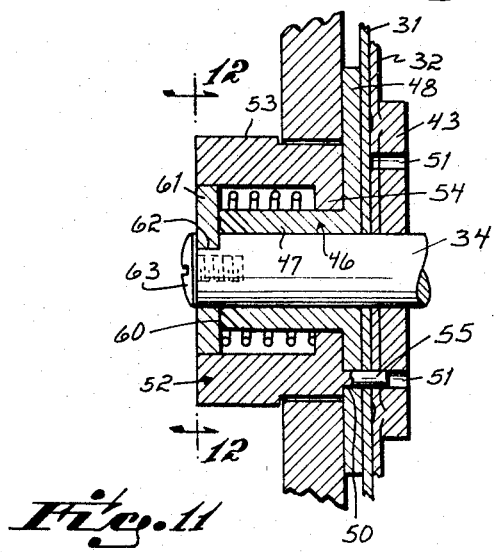
FIGURE 11 is a cross sectional view taken along line 11—11 of FIGURE 10.
Figure 12:
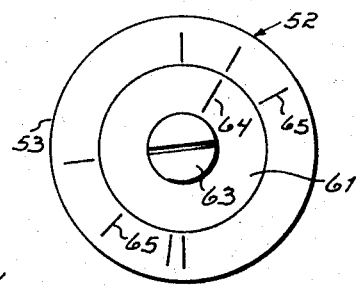
FIGURE 12 is a front elevational view of the lens aperture selector knob as viewed from line 12—12 of FIGURE 11.

Selective adjustment of the shutter speed is provided by the mechanism best shown in FIGURES 10, 11 and 12. More particularly, shaft 34 extends forwardly through the shutter blades beyond the inner panel 13. The rear shutter blade 32 is rigidly secured to a hub 43 which is staked, keyed or otherwise mounted for rotation with shaft 34. It will be noted that the rear shutter blade is counterbalanced by means of an arcuate weight 44 mounted upon the rear surface of the shutter blade intermediate hub 43 and the removed segment 33 of the blade. Similarly, the front shutter blade is counterbalanced by the removal of a second arcuate segment 45 identical with segment 33 diametrically opposite to the segment 33 of that blade.

It will be appreciated that the second segment 45 in the front shutter blade can also be utilized in cooperation with the segment 33 in the rear blade to define the effective opening 33'. This provides a greater number of different shutter openings while allowing maximum spacing of openings 51.

The front shutter blade 31 is carried by a hub 46 rotatably mounted upon shaft 34. Hub 46 includes a sleeve portion 47 which surrounds the shaft 34 and a radial flange portion 48 disposed intermediate inner panel 13 and forward blade 31. The front blade 31 is permanently secured in any suitable manner to the hub 46. It will be noted that hub flange 48 and front shutter blade 31 are provided with a single opening 50 while the rear shutter blade 32 and its hub are provided with a series of openings 51 disposed upon the circumference of a circle relative to the center of shaft 34.

An annular knob member 52 is mounted over the outer end of shaft 34 and over sleeve portion 47 of front hub 46. Knob member 52 is provided with a knurled peripheral portion 53 extending forwardly of inner panel 15 and an inwardly extending flange 54 rotatably engaging sleeve portion 47. The knob 52 carries an axially extending pin 55 which is press fit or otherwise secured to the inner side of the knob member. This pin is of a slightly smaller diameter than the diameter of openings 50 and 51 so that the pin can readily be inserted in, or withdrawn from, these openings. It will be appreciated from FIGURE 11 that when the knob is in its normal advanced position, pin 55 engages the opening 50 in the front shutter blade and one of the openings 51 in the rear shutter blade. Thus, the front shutter blade is positively locked in a selected orientation relative to the second shutter blade and rotates with that shutter blade as the rear shutter blade is driven by shaft 34. When the knob is in this position, the knob can be turned manually to adjust the position of the shutter assembly 20.

Knob 52 can also be shifted outwardly along sleeve 47 to a position in which it is disengaged from the apertures 51 in the rear shutter blade 32 and hub 43 and engages only the aperture 50 in the front shutter 31 blade and its hub. In this retracted position, rotation of the knob is effective to cause rotational movement of the outer shutter relative to shaft 34 and relative to the rear shutter blade 32. When the desired relative adjustment is obtained, knob 52 is shifted inwardly to reengage the opening 51 in the rear shutter and hub with which the pin is aligned.

The hub is normally held in its advanced position shown in FIGURE 11 by means of a coil spring 60. This spring is disposed in the annular space between the peripheral wall of the knob and sleeve portion 47 on hub 46. The inner end of the spring abuts flange 54 of the knob while the outer end of the spring abuts an annular plate 61 carried by shaft 34. As shown in FIGURE 11, the outer end of shaft 34 is provided with a flat 62. The opening in plate 61 which fits over the shaft is similarly provided with a flat edge so that the plate is held in predetermined orientation relative to the shaft. Plate 61 is secured by a bolt 63 which threadably engages an opening formed in the end of shaft 34. When the bolt 63 is tightened down and plate 61 is in its innermost position shown in FIGURE 11, spring 60 holds pin 55 in engagement with both the front and rear shutter blades and hubs. However, knob 52 can be grasped and pulled outwardly against the force of spring 60 to disengage pin 55 from the rear shutter blade and its hub. Spring 60 still retains the hub on the shaft 34 in a position in which pin 55 engages the front shutter blade so that rotation of the knob is effective to cause rotation of that blade.

The relative position of the blades can relatively be selected by aligning suitable indicia provided on plate 61 and knob 52. More particularly, plate 61 is provided with a mark 64. Since this plate is always carried in the same orientation by shaft 34, this mark also corresponds to the position of the rear shutter blade. A cooperative series of radial marks, or the like, 65 are provided on the knob 52. The position of this knob corresponds to the position of the forward shutter blade 31. The marks 65 are located so that when the knob 52 is rotated to bring one of the marks 62 into alignment with mark 64, pin 55 carried by the knob is in alignment with one of the holes 51 in the rear shutter blade and hub. These marks thus provide a precise indication of the amount of overlap between the shutter blades and, hence, the size of the effective opening 33'. This in turn controls the length of exposure. Thus, the exposure time of the present camera is controlled by withdrawing knob 52 axially and then rotating the knob until a selected one of the marks 65 is brought into alignment with mark 64. Thereafter, the knob 52 is released and is forced inwardly by spring 60. This movement causes pin 55 to lock the two shutter blades together for rotation in unison with shaft 34.

As was explained previously, the film is transported in the camera from supply reel 16 past sprocket wheel 25 through the film gate assembly 15, back past sprocket wheel 25, and is wound onto takeup reel 17. The supply and takeup reels are of generally conventional construction. As is shown in FIGURES 6 and 7, each reel includes two cricular side walls 66 and 67 joined by a hollow cylindrical spool portion 68. Each of the side walls is provided with an aperture of generally rectangular configuration.

The construction of the supply reel supporting assembly shaft 70 and the takeup reel supporting shaft assembly 71 are substantially identical. Consequently, only the takeup reel supporting shaft assembly 71 will be described in detail. This shaft assembly and the takeup reel 17 are shown in detail in FIGURES 7 and 17. More particularly, as there shown, the shaft assembly comprises an elongated cylindrical stub shaft 72 provided with a slotted head 73 at one end and a threaded section 74 at the other. The threaded section 74 passes through an opening in downwardly extending bracket member 75 and is held in position as by means of a nut 76.

Stub shaft 72 carries a cylindrical outer sleeve 78 preferably formed of a suitable plastic and an inner sleeve member 80. Sleeve 80 includes a cylindrical portion and a plurality of outwardly extending fingers 81 spaced an appreciable distance from the stub shaft member 72. Each of the fingers 81 includes a gradually sloping outer face 82 and a sharply sloping inner face 83 defining a crest. The fingers 81 fit between four fingers 85 formed on pulley member 86. The pulley member is rotatably mounted upon stub shaft 72. The outline configuration of each of the four fingers 85 is that of a square only slightly smaller than the square aperture in the side walls 66, 67 of the reel member. The crests 84 of fingers 81 normally extend outwardly beyond the fingers 85. When the reel is placed over the shaft assembly, the edges of the square aperture in the reel cam the fingers downwardly and the innermost side wall of the reel passes over the crests inwardly into contact with the pulley. At this point, the fingers 81 spring outwardly and the crests 84 lock the reel in position. The reel is thus firmly held in place with the recess in the outer wall of the reel 67 engaging the outer sleeve 78 as shown in FIGURES 6 and 7. When the reel and sleeves rotate about shaft 72, there is no appreciable noise and the reel does not wobble or rattle.

As indicated above, shaft assembly 70 is identical with shaft assembly 71. The supply reel shaft is mounted on a second depending bracket member 79. The pulley 97 carried by the shaft assembly is engaged by a stationary retarding spring 98.

The pulley of the takeup reel is preferably provided with a slightly knurled peripheral groove for engagement with the secondary drive belt 87 which drives the pulley. Secondary drive belt 87 is preferably a conventional flexible spring belt which can slip relative to pulley 97. This belt is driven from the smaller pulley 88 of a double pulley member 90. Between the double pulley 90 and the pulley member 86, the belt is trained over the angulated idler pulleys 89 rotatably mounted in a block 99 carried by the frame member 22. Double pulley member 90 is mounted upon a sleeve rotatably carried by shaft 91 rigidly mounted on main frame member 22. The upper end of this bushing surrounding shaft 91 also carries sprocket 25.

Sprocket 25 engages the film 19 as it is guided by stationary guide members 24, 27 and 92. Each of the guide members 24 and 27 is of serpentine configuration, including an end convex section 93, a central concave portion 94 and a second end convex portion 95. Preferably, the vertical center portion of each of the guide members is relieved so that the film is engaged only along its bottom and top edges, not in the exposed area. These guide members are bolted to a plate 58 mounted on frame member 22 with the concave portions 94 disposed closely adjacent to opposite sides of sprocket 25 as best shown in FIGURE 4.

Stationary guide member 92 is also bolted or otherwise secured to frame member 22 and includes two arcuate walls closely spaced from sections 93 of the guide members 24 and 27. A fourth film guide wall 96 is mounted upon the plate 58. This is a straight wall section which extends from a point closely adjacent the sprocket 25 a substantial distance toward film gate assembly 15. The end of wall 96 closest the film gate is disposed midway between arcuate sections 95 of guide members 24 and 27. The film path through the guide members is best shown in FIGURE 4. As there shown, film 19 from the supply reel passes between guides 92 and 24. It is then engaged by the sprocket wheel and emerges in the space between section 95 and wall 96. The film passes through the film gate assembly 15 and through the space between wall 96 and guide 27. The film is again engaged by the sprocket and emerges in the arcuate space between guide 27 and guide member 92. The film passes from this point directly to the takeup reel 17.

Double pulley member 90 and sprocket 25 are carried on a bronze seleeve and are rotated as an assembly about shaft 91. As is best shown in FIGURES 3 and 5, drive belt 42 engages a pinion 100 mounted upon the output shaft 28 of motor 21. The main drive belt passes from that pinion around the larger pulley section 101 of double pulley member 90. It then passes over an idler pulley 102 and around pulley 40 on the shutter shaft. From pulley 40 the belt passes over a second idler pulley 103 and thence around a pulley 104 carried by shaft 105 forming part of member 106 of the film advance mechanism. The belt passes from this point around an idler pulley 107 from which it returns around drive pinion 100. This belt and the secondary belt are thus effective to drive the takeup reel 17, sprocket 25, shutter 20 and film advance mechanism 15 in unison and with a minimum amount of noise.

The details of construction of the film gate assembly 15 are best shown in FIGURES 4, 8 and 9. More particularly, the film gate assembly comprises a front frame member 110. This frame member includes an upstanding vertical wall 111 and a rearwardly extending flange, or foot portion 112 bolted to plate 58. Flange 112 is provided with two parallel dovetail slots 116 for slidably receiving two T-shaped lugs 118 formed on the lower edge of pressure plate 117.

The front frame member is provided with a rectangular opening 113 defining the exposed area of the film. An elongated claw-receiving slot 114 extends from the lower central portion of rectangular opening 113 a substantial portion of the way toward the left-hand edge of the frame member as viewed in FIGURE 9. The frame also includes an overhanging upper lip 115 adapted to engage and retain the upper edge of the film strip.

Pressure plate 117 is preferably provided with a beveled top and beveled side edges. The pressure plate is spring urged forwardly to a position in which it holds the film flat behind opening 115 by means of a spring 120 compressed between a recess 121 formed in the rear wall of the pressure plate and a retaining lug 122 formed on the forward edge of divider wall 96. The pressure plate can be pulled rearwardly against the spring force to permit easy insertion of the film between the pressure plate and frame member 110. After the film is inserted, the pressure plate is released and springs forwardly. The film is held flat against the frame member by the pressure plate but is free to move transversely in a horizontal direction. The pressure plate is provided with an elongated milled slot 123 in alignment with slot 114 of the frame member. Slot 123 receives the film advance claw as the film is advanced through the film gate. The pressure plate can also readily be removed for cleaning, or the like, by shifting it rearwardly to disengage lugs 118 from dovetail slots 116.

The details of the film advance mechanism are best shown in FIGURES 3, 5, 8 and 13–16. More particularly, the film advance mechanism includes a film advance claw 26 mounted upon an elongated claw arm 124. Claw arm 124 is pivotally carried at 125 by crank member 106. As explained above, crank member 106 is mounted upon shaft 105 and is driven by the engagement of main drive belt 42 with pulley 104. The free end of the claw arm on the side of claw 26 remote from its pivotal engagement 125 of crank member 106 is pivotally connected to a link member 127. The opposite end of link 127 is rotatably mounted in a bushing sleeve 128. The link 127 and claw arm 124 are of substantially equal length of the order of three times the throw of crank 106.

The time relationship of the claw movement to the operation of the shutter is best shown in FIGURES 13–16. More particularly, during the exposure period when the shutter is open, as indicated in FIGURE 13, the film 19 is stationary in the film gate and the claw is disengaged from the film, being shifted to the right as viewed in FIGURE 13. After the film has been exposed and the shutter is closed, the claw advances toward the film and engages a sprocket hole in the film through slots 114 and 123 beneath the central portion of the film gate opening 113. While the shutter remains closed, the claw advances the film, i.e., shifts it to the left as shown in FIGURE 15. During this movement, the claw moves in and out slightly relative to the film, but this has been found to have no deleterious effect.

Immediately prior to the time the effective shutter aperture is aligned with the opening 29, the claw is disengaged from the film as shown in FIGURE 16 so that the film is stationary in the film gate.

In installing the camera the housing is secured to a mullion which is adjusted to point the lens 12 in the desired direction. The lens is accurately positioned and the lens focused in a conventional manner by means of a reflex viewing mirror 130. Mirror 130 is adapted to be locked out of the way during normal operation of the camera as shown in FIGURE 5. However, this mirror can be shifted to a position in which the field of view through the lens appears on a ground glass plate through window 131.

More particularly, mirror 130 is carried on a mounting bracket 132. This bracket includes two curved flanges which slidably engage an elongated transverse rod 134. The mirror is normally spring urged to the position shown in FIGURE 5 by means of a light tension spring 135 which interconnects bracket 132 and a wall 136 of the frame member. However, the mirror can be shifted to a position behind the lens and opening 29 and under viewfinder window 131 by means of an actuating lever 137. This lever is pivotally mounted on inner panel 13 of the camera and carries a link 138 adapted to engage an abutment finger 140 formed on bracket 132. When the lever is depressed, its shaft 141 pivots, pivoting link 138. This link then forces the mirror and bracket 132 to slide along rod 134 to a position behind the lens. The mirror is held at a 45° angle so that the same image appears in the finder that would be projected upon the film. After the camera has been positioned, the mullion adjustments are tightened and lever 137 is released, allowing the mirror to return to its out-of-the-way storage position shown in FIGURE 5. The lens aperture is set in a conventional manner and the shutter speed is set by manipulating knob 52 in the manner explained above.

The camera is loaded with film by removing the front cover panel 93. The inner panel 13 is then pulled outwardly from the shell portion of the housing by means of a suitable handle (not shown). A reel of film is then placed over shaft 70 and the film is threaded through the guides adjacent to the sprocket wheel. The pressure plate is pulled rearwardly and the film is inserted in the film gate. The free end of the film is secured to the takeup reel in the usual manner. After the film is inserted, the inner panel 13 is again inserted in the camera housing and the front cover panel replaced, and the camera is ready for operation.

In normal operation, as is explained in the copending application of Donald E. Hansen and Eric G. Quist for "Camera Control Circuit," the camera may be actuated from a remote switch; for example, a teller's foot switch, a money clip switch or the like. This is normally done either when the teller notes that there is a suspicious person present, or when there is an actual robbery in progress. The camera will then proceed to take a large number of rapid sequence photographs of the critical area, such as the area in front of the teller's cage, or the like. Because of the large number of photographs and the relatively large format, in almost every case one or more clear photographs is obtained of the robber. These photographs can be greatly enlarged and circulated to speed the robber's apprehension.

Because of the belt drive and the small lightweight parts, the present camera mechanism has an extremely small inertia. Consequently, the camera can be stopped after each exposure with the shutter opening just past alignment with the lens and opening 29. When the next sequence is started, the shutter rotates and is brought up to the same speed before the effective shutter aperture again is aligned with the lens and film. As a result, excellent control is maintained over the exposure time. The belt drive and reel construction cause the camera to operate in a very silent manner so that a robber, or other subject, is not aware that his photograph is being taken.

Having described my invention, I claim.:

1. In a sequence camera the combination comprising, a lens, a film gate disposed behind said lens for receiving film and defining a film plane, a rotary shutter disposed between said lens and said film gate, a supply reel and takeup reel disposed in spaced parallel planes extending transversely to said film plane, said supply and takeup reels being disposed on opposite sides of said camera and of the rotary shutter rearwardly of and below said film gate, a film advance mechanism, an electric motor disposed between said supply reel and said takeup reel and having an output shaft thereon, and flexible belt means providing the sole drive interconnection between the output shaft of said motor and said takeup reel, said film advance mechanism and shutter.

2. The camera mechanism of claim 1 further comprising a single sprocket for engaging said film in its path intermediate said supply gate and film gate and intermediate said supply gate and said takeup reel, said belt drive means being further effective to rotate said sprocket.

3. The camera mechanism of claim 2 in which said belt means driving said sprocket, said film advance mechanism, and said rotary shutter comprises a flexible timing belt.

4. In a sequence camera the combination comprising, a lens, a film gate disposed behind said lens for receiving film and defining a film plane, a rotary shutter disposed between said lens and said film gate, a supply reel and takeup reel disposed in spaced parallel planes extending transversely to said film plane, said supply and takeup reels being disposed on opposite sides of said camera rearwardly of and below said film gate, a film advance mechanism, an electric motor having an output shaft thereon, and belt means interconnecting said motor and said takeup reel, said film advance mechanism comprising a film advance claw arm carrying a claw for engagement with a perforation of said film, a crank pivotally interconnected to one end of said claw arm, a link pivotally connected to the opposite end of said claw arm, said claw engaging said film in the central portion of said film gate and remaining in engagement with said film as said claw advances a substantial distance toward the end of said film gate.

5. The apparatus of claim 4 in which said film arm and link are of approximately the same length and are of the order of three times the length of the throw of said crank arm.

6. In a motor driven sequence camera of the type including a lens and a film gate disposed in alignment with said lens, the novel features which comprise a rotary shutter mechanism interposed between said lens and said film gate, said shutter mechanism including a rotary shaft driven by said motor, a first disc, means rigidly mounting said first disc on said shaft, a second disc, means mounting said second disc on said shaft adjacent to said first disc, said last named means being effective to permit pivotal movement of said second disc relative to said first disc, each of said first and second discs having peripheral segments removed therefrom to permit passage of light from the reels to the film gate, means for adjustably positioning one disc relative to the other, said means comprising a plurality of spaced openings formed in said first disc, said openings being disposed about the circumference of a circle, an opening in said second disc, a pin extending through the opening in said second disc and disposed in engagement with one of the openings of said first disc, first means for shifting said pin axially, whereby it becomes disengaged from the openings in said first disc to permit pivotal movement of said second disc, and second means locking said pin in engagement with the openings in both said first and second disc.

7. The apparatus of claim 6 in which said first means comprises a knob carrying said pin, said knob being mounted over said shaft and being adapted to be rotated and reciprocated along said shaft.

8. The apparatus of claim 7 in which said second means includes a flatted portion on said shaft, a member adapted to be fitted over said shaft in engagement with said flatted portion, and a spring interposed between said member and said knob, said spring being effective to urge said knob and pin towards said shutter discs.

9. The apparatus of claim 8 further comprising a bolt threadably engaging said shaft and having a head in engagement with said member, said knob being slidable along said shaft to a position in which said pin is disengaged from the openings in said first disc but is retained in engagement with the opening in said second disc.

10. The apparatus of claim 9 in which said knob and said member are provided with cooperating indicia for indicating the relative position of said shutter members.

11. In a sequential camera of the type including a takeup reel and a supply reel, the novel feature which comprises a mounting for said reels, said reel mounting including a shaft, an outer sleeve rotatably disposed over said shaft, an inner sleeve disposed over said shaft, a plurality of spaced resilient fingers carried by said inner sleeve, said spaced fingers being normally spaced from said shaft, each of said resilient fingers being configurated to form an outwardly extending crest portion, and a pulley member disposed over the inner portion of said shaft, said pulley member being provided with a plurality of spaced axial fingers adapted to interfit between the resilient fingers of said inner sleeve, the crests of the resilient fingers on said inner sleeve extending outwardly beyond the periphery of the fingers of said pulley member.

12. The rear mount of claim 11 in which said axial fingers of said pulley member define a support of generally square outline configuration.

13. In a sequence camera the combination comprising, a lens, a film gate disposed behind said lens for receiving film and defining a film plane, a rotary shutter disposed between said lens and said film gate, a supply reel and takeup reel disposed in spaced parallel planes extending transversely to said film plane, said supply and takeup reels being disposed on opposite sides of said camera rearwardly of and below said film gate, a film advance mechanism, an electric motor having an output shaft thereon, and belt means interconnecting said motor and said takeup reel, said film gate comprising a frame member having a generally rectangular opening, said frame being configurated to form a rearwardly extending lip and a bottom rearwardly extending flange, said flange having a plurality of dovetail slots therein, a pressure plate having a beveled top and side edges and a plurality of lug members adapted to be received in said dovetail slots, and spring means engaging the rear of said pressure plate to urge it against said frame member.

14. The apparatus of claim 13 in which said frame member is further provided with an elongated, transversely extending slot disposed beneath said rectangular opening for receiving a film advance claw, said pressure plate being provided with a second slot in alignment with said first mentioned slot for receiving said film advance claw.

References Cited

UNITED STATES PATENTS

| | | | |
|---|---|---|---|
| 2,653,507 | 9/1953 | Riles et al. | 352—209 X |
| 2,909,096 | 10/1959 | Barnett | 95—11 X |
| 3,208,685 | 9/1965 | Edwards et al. | 242—71.2 |

CHARLES E. SMITH, *Primary Examiner.*

NORTON ANSHER, *Assistant Examiner.*

U.S. Cl. X.R.

242—71.2; 352—209